United States Patent

[11] 3,585,345

[72] Inventor Karl G. Jespersen
 1307 11th St., Vienna, W. Va. 26101
[21] Appl. No. 812,768
[22] Filed Apr. 2, 1969
[45] Patented June 15, 1971

[54] APPARATUS AND METHOD FOR WELDING
 6 Claims, 5 Drawing Figs.
[52] U.S. Cl....................................... 219/83,
 219/67, 219/106, 219/161
[51] Int. Cl....................................... B23k 11/06
[50] Field of Search........................... 219/83, 67,
 106, 84, 60.1, 158, 159, 161

[56] References Cited
 UNITED STATES PATENTS
2,013,630 9/1935 Goldsborough............ 219/60.1
2,265,943 12/1941 Laig............................ 219/106
3,102,187 9/1963 Coscia......................... 219/60.1
3,175,072 3/1965 Dyer et al.................... 219/60.1
3,209,118 9/1965 Dyer et al.................... 219/106

Primary Examiner—J. V. Truhe
Assistant Examiner—Hugh D. Jaeger
Attorney—Cushman, Darby & Cushman ABSTRACT: A welding assembly is described as having arm members which will clamp the electrode assembly onto pipe sections or like objects which are to be butt-welded. A performed ring of filler material is provided which conforms to the shape and size of the interface between the sections to be welded. The electrode assembly comprises three rollers one of which abuts the filler ring and the others make contact with the pipe sections. A current path is established between the electrode abutting the filler ring and each of the remaining electrodes through the filler ring and that pipe section with which said one of said other electrodes is in contact. The entire assembly may be readily adjusted to be used with any size pipe merely by adjusting the spread distance between the arm members which clamp the electrode assembly to the pipe.

INVENTOR
KARL G. JESPERSEN

BY Cushman, Darby & Cushman
ATTORNEYS

INVENTOR
KARL G. JESPERSEN

BY Cushman, Darby & Cushman
ATTORNEYS

APPARATUS AND METHOD FOR WELDING

This invention relates to a means for resistance welding, and in particular to a compact and easy-to-use means for resistance seam welding the ends of objects of various sizes and materials in the environment in which the objects are to be used.

The invention described herein is described principally in the contest of its usefulness in welding pipe. Those skilled in the art, however, will realize the desireability of utilizing the principles of this invention to devise welding apparatus for joining objects of many different configurations.

In resistance welding a fusion between the objects to be welded is produced by the heat obtained from the resistance offered by the work to the flow of electric current in a circuit of which the workpiece is a part. The resistance of the welding circuit is at a maximum at the interface of the parts to be joined, and the heat generated there must reach a value high enough to cause a localized fusion. Although there are a number of different types of resistance welding processes, the process principally used for pipe welding, that is, the welding together of the abutting circumferential edges of two pipe sections, is seam welding. In seam welding a series of spot welds are produced which can be made by rotatable wheel-type electrodes. The weld may be a series of closely spaced individual spot welds, overlapping spot welds or a continuous weld nugget. Most machines now in use for this purpose comprise a source of electric current and a suitable means for conducting said current to the point requiring fusion. One pole of the current being applied as a ground or negative pole and the other pole comprises a rod or wire, which when in the close proximity of the grounded metal will produce an arc. This arch should be of sufficient intensity to melt both the rod or wire and the adjacent metal, thus, forming a molten pool of metal. The continuous feeding of the rod or wire will add materials to the pool and by progressively advancing along the void between the adjacent pieces of metal to be joined the molten metal from this rod or wire will fill this void and when it is cooled, comprise a welded joint. The skill required by the operator for this art requires proper manipulation of the rod or wire, both in feeding the required amount of materials to the pool and in melting the parent metals on each side of the void. This intricate manipulation, particularly on the sides and bottom of stationary objects such as a pipe which is not moveable, requires a long and tedious practice to perfect the technique of producing a sound and acceptable piece of welded material.

Welding devices have been proposed which place both electrodes on the exterior surfaces of the pipe. In these devices one electrode usually abuts the seam with filler material possibly being placed thereunder, and the other electrode or electrodes abut the surfaces of the pipe. Thus, a current path is established through the pipe which will produce sufficient heat to accomplish the weld. In using such presently available machines, however, one is generally confronted with a mass of complex machinery which does not lend itself to easy operation nor to accomplish the welding operation in a small amount of time. These machines usually consist of a great deal of structure devoted to positioning, aligning and holding the pipe in place to be welded along with the necessary driving means to either drive the welding head or to rotate the pipe. While such machines may be transported to a construction site, although with great difficulty because of their bulk, they may not be readily used for welding ends of pipes which have already been mounted in place in the structure of which the pipe is to become a part. Thus, the pipe sections to be welded with these prior art devices must be welded prior to their final placement. Furthermore, because of the sheer size and weight of these prior art machines, they cannot be readily operated by one man; thus, necessitating the diversion of a substantial part of a construction crew from other pursuits to the pipe welding operation.

While comparatively thin edges may be seam welded by melting together the edges without adding further metal, for heavier sections, such as one would encounter when butt-welding pipe, it is customary to prepare the edges for welding by beveling outwardly their edges so that a V-shaped void or groove is formed with the apex nearer the inner wall at the point where the two pipes are abutting, the groove so formed is, during the welding process, filled with metal melted from a welding rod or electrode, and in this way a fusion weld coextensive with the thickness of the part is formed. In order to facilitate proper filling of the groove with molten metal the welding rod is customarily of a round cross-sectional shape and of a size smaller than the groove formed by the beveled edges of the pipe. In many prior art devices the welding rod is of an indefinite length and wrapped around a reel so that it is necessary for the operator to unreel the welding rod and hold it in position while the welding process is continuing. It has been suggested, in the case of pipe butt-welding that preformed welding rings made of filler material be used. These rings have the triangular cross-sectional shape to fit into the groove formed by the beveled edges of the pipe and are of the proper diameter to fit around the pipe. Thus, these rings or fillets may be simply snapped into place making necessary no further manipulation of the filler material. The preformed rings presently in use, having the necessary triangular cross-sectional shape, have a more acute angle at the apex than the groove formed by the beveled edges to reduce the possibility of air entrapment in the groove and to facilitate heating first at the bottom or apex of the grooves. These rings must then be provided with laterally extending projections or barbs to hold the rings in position in the groove. Welding of such rings is accomplished by making a first pass which tack welds each of the barbs to the pipe edge with which it abuts, and then making a final welding pass to accomplish he complete weld. The necessity for making two welding passes, of course, materially increases the time needed for welding thereby substantially reducing the efficiency of the machine. In addition, it has been found that rings with these lateral projections or barbs will not fuse uniformly due to a nonuniformity in conduction through the filler material. Thus, cold spots or unwelded areas will be formed thereby materially reducing the strength of the welded seam.

It is therefore an object of this invention to provide an apparatus for seam welding the ends of pipes or like objects which will perform the welding operation entirely on the exterior surfaces of the workpieces.

It is another object of this invention to provide a welding assembly for resistance welding which may readily be attached to existing welding machines and which is compact and easily manipulated by a single operator. varying A further object of this invention is to provide a welding electrode assembly conforming to the above objects which will weld abutting ends of objects which have been placed in the structure of which they are to become a permanent part, and which will readily conform to objects of varying diameters and materials.

Till another object of this invention is to provide a preformed ring of welding material adapted to cooperate with abutting beveled edges which will permit uniform conduction of current therethrough thereby producing a seam of uniform strength, and which will permit the welding electrode assembly around the pipe surface.

The aforementioned and other objects may be obtained by adhering to the principles of this invention as defined in the specification and claims hereinbelow.

The invention may be best understood by referring to the description of a preferred embodiment given hereinbelow and the accompanying drawings in which.

In referring to the specification in conjunction with the drawings it will be noted that the terms "forward," "rearward," "upper" and "lower" are used. It is to be noted that these terms are only relative to the operation of a preferred embodiment on horizontal pipe sections.

DETAILED DESCRIPTION OF THE DRAWINGS

Figure 1:
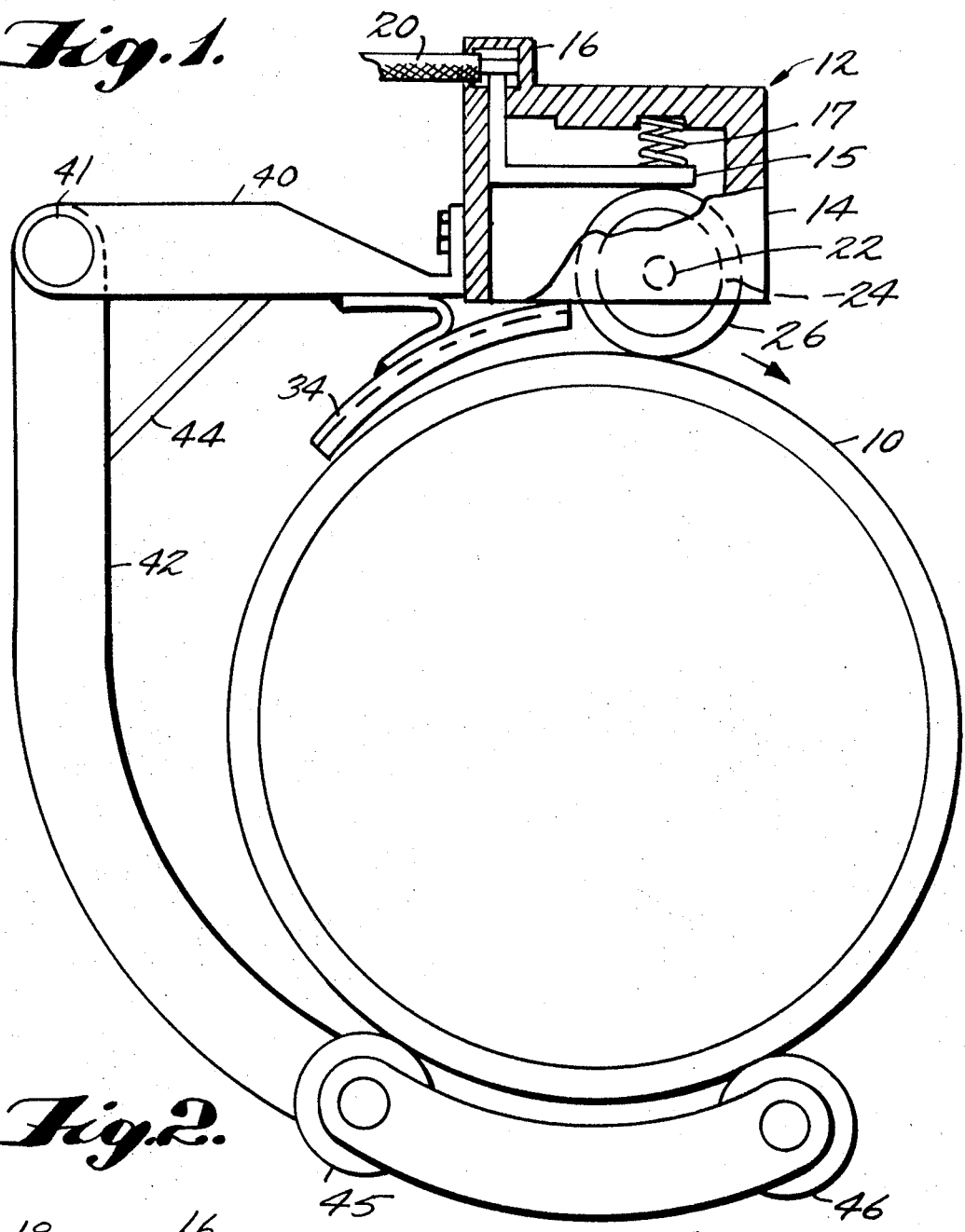
FIG. 1 is a side elevational view of a preferred embodiment of the welding electrode assembly and support members constructed according to the principles of this invention with a fragmented side cross-sectional view of the welding electrode assembly.
Figure 2:
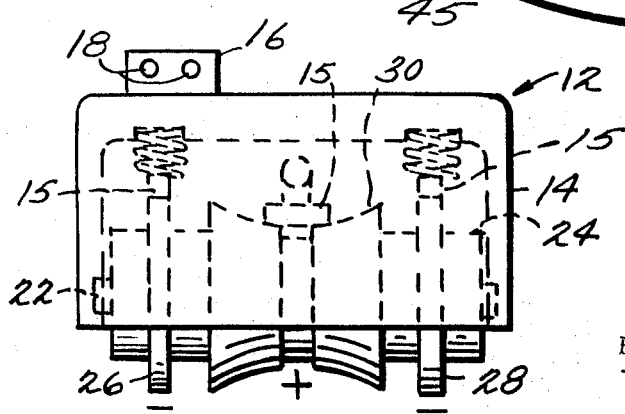
FIG. 2 is a front, relative to the direction of travel of the electrode assembly, welding electrode assembly shown in FIG. 1.

FIGS. 1 and 2 illustrate the details of the welding assembly including the electrode assembly and the support members therefore constructed according to the principles of this invention. In FIG. 1 the pipe being welded is referred to generally by the numeral 10. Obviously, in the end view shown only an end of one of the pipe sections being welded opposite the end of that section forming the seam can be shown. The configuration of the abutting ends of the pipe sections being welded along with the filler ring or fillet are illustrated in more detail in FIG. 3. The welding electrode assembly 12 encased is in a housing 14 which may be made of Bakelite or a like material. Projecting upwardly from the housing 14 and integral therewith is a terminal housing 16 in which are located terminals 18 which may be connected by means of leads 20 to a welding machine or source of current. Journaled into the lower forward portion of housing 14 is shaft 22 made of a nonconductive material upon which is coaxially and rotatably mounted a single cylindrical body 24 which may be made of a ceramic material adapted to withstand high temperatures. Ring-shaped roller electrodes 26 and 28 are coaxially and fixedly mounted on the ceramic cylinder and at the ends thereof to form the electrodes which will come into contact with the pipe sections being welded. Centrally mounted on the ceramic cylinder and coaxial therewith is a ring-shaped roller electrode 30 having an outer surface which is shaped to conform to the shape of the exterior surface of the preformed welding ring placed in the seam. This aspect of the center electrode will be discussed further hereinbelow. When the welding electrode assembly 12 is placed in contact with the pipe sections and filler material therebetween, current flow between electrode 30 and electrodes 26 and 28 through the pipe sections and filler.

Each of the roller electrodes 26, 28 and 30 are made of a conductive material, such as metallic tungsten. These roller electrodes are electrically connected to the terminals 18 by conventional brushes 15, and in the preferred embodiment those portions of the brushes 15 which make contact with the roller electrodes are forced against the electrodes by compressed springs 17 which are attached to the housing 14 and the brushes. By this means, a uniform contact between brushes and electrodes is at all times insured.

Attached to the rear of housing 14 and extending below and rearwardly therefrom is an elongated shoe member 34 which rides behind the electrode assembly as it travels around the pipe and which is adapted to cover a portion of the welding filler ring while not touching it. The shoe 34 does touch the pipe to prevent the molten metal from sagging on the lower portion of the pipe. This is only required on heavy wall pipe as the light wall pipe will cool by conducting the heat away from the welded area in a very short period of time. The heavy section will need support during the cooling cycle.

Extending horizontally from the rear of housing 14 is an arm member 40 which is pivotally attached to a second downwardly extending arm member 42 which has a curved shape allowing it to substantially wrap around the surface of the pipe 10 opposite that portion of the pipe upon which the electrode assembly is positioned. The means for attaching arm members 40 and 42 is a bolt 41 or the like which may be loosened to allow the arm members to be spread apart or pushed together. Further, a tensioning means like that indicated as 44 may be used to insure that a sufficient clamping force maintains the electrode assembly in contact with the pipe, and to insure that a proper pressure is being maintained on the fillet. Therefore, when it is desired to place the support assembly for the electrode assembly 12 comprising arm members 40 and 42 around the pipe sections to be welded it is necessary only to clamp it on the pipe by means of the arm members, and by pushing the arm members together in a clamping motion or by allowing them to be pulled together by the tensioning means and tightening them by means of bolt 41 the entire welding electrode assembly if firmly attached to the pipe sections to be welded. On the curved portion of arm member 42 idler or clamping rollers 45 and 46 are placed in a spaced relationship allowing the entire welding assembly to travel around the pipe in the direction shown.

Figure 3:
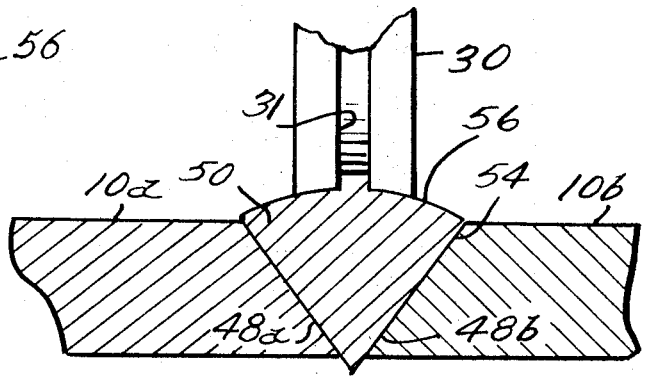
FIG. 3 is an enlarged view of a partial cross section of the abutting pipe ends with the preformed filler ring inserted therebetween and with one of the roller electrodes of the welding electrode assembly placed on the filler ring.

In FIG. 3 is shown a fragmentary longitudinal cross-sectional view of the upper walls of the abutting pipe sections 10a and 10b to be joined by welding and a portion of a filler ring 50 inserted therebetween. Roller electrode 30 is shown in contact with the filler ring. The ends of pipe sections 10a and 10b are shown beveled outwardly at an angle of 37½° from the vertical forming groove 54, but it must be realized that a number of bevel angles are possible. The preformed ring of filler material 50 has a cross-sectional shape conforming to the shape of the groove formed by the abutting beveled edges 48a and 48b. Thus, in this case the ring has a cross-sectional shape which is substantially triangular. It is important to note that the angle of the apex of the fillet in substantially equal to the angle of the apex of the groove making the cross-sectional size and shape of the welding ring constructed according to the principles of this invention such that it will entirely or substantially entirely fill the groove formed by the beveled pipe edges without the need for barbs or lateral projections to support the ring in the groove. Furthermore, ring 50 is of a diameter greater than the pipe and is provided with a convex crown portion 56 curving upwardly from the sides of the ring. This crown portion provides added welding material at the joint in order to reinforce the welded seam. As shown in FIG. 3, the roller electrode 30 which makes contact with the filler ring 50 has an outer longitudinal surface which is concave-shaped to conform to the curved crown portion 56 of the filler ring. In addition, an annular projection 51, here shown as rectangular, but which may be of any shape, extends upwardly from the central portion of the crown 56 of the filler ring. A groove 31 is provided on roller electrode 30 which mates with the projection so that the two may cooperate to provide a guiding means for the center roller electrode 30. It will be noted from this figure that the roller electrode 30 has an exterior surface which is of a size allowing it to cover only approximately 75 percent of the outer surface of filler ring 50 allowing the seam to be readily inspected as the welding operation progresses.

Figure 4:
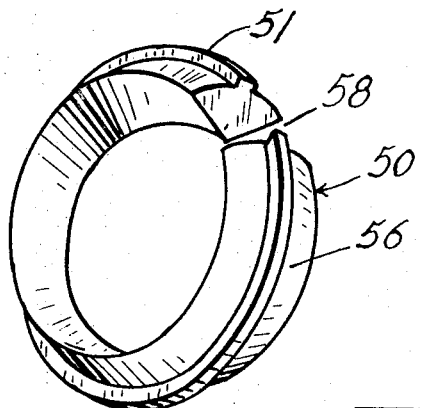
FIG. 4 is a side elevational view of the preformed ring-shaped fillet constructed according to the principles of this invention.

As best shown in FIG. 4, the filler ring or fillet 50 is discontinuous or slightly less than 360° in circumference. The ends of the ring define a gap 58, the width of which will be dependent upon the temperature rise experienced during welding and the composition of the ring and pipe being welded. When the ring 50 is heated during the welding process, the ring will tend to creep so that its ends will be joined by the time the welding process is completed or the welding electrode assembly has traveled slightly more than 360°. Therefore, the width of gap 58 must be determined by the coefficient of expansion of the metal from which the ring is formed.

DESCRIPTION OF OPERATION

Figure 5:
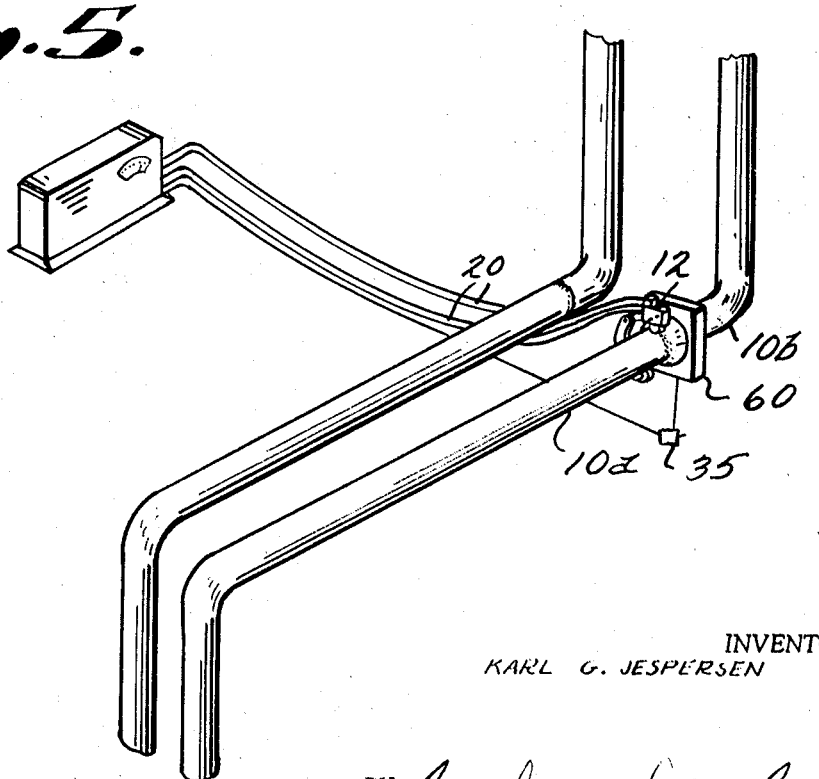
FIG. 5 is a diagrammatic illustration of the preferred embodiment of the welding apparatus constructed according to the principles of this invention in operation on pipe sections already placed in the structure of which they are to become part.

In order to most clearly understand the operation of this invention reference should be made to FIG. 5 in conjunction with the figures described hereinabove. In FIG. 5 are shown the pipe sections to be joined, and it will be noted that these pipe sections have been permanently placed and aligned, by any means desired, in the structure of which the pipe is to become a permanent part. Therefore, no complicated positioning, aligning or holding apparatus is needed for welding purposes obviating the need for positioning and holding the pipe for welding and performing this same operation when the welded pipe is put into place.

The welding assembly is placed at the juncture of the ends of the pipe sections to be welded, as described above and is firmly affixed thereto by the clamping action of arm members 40 and 42. A moving means 60, of any of the well-known types, such as those used in commercially available pipe cutting assemblies, shown here diagrammatically is attached to the welding electrode assembly and its support members. A single switch 35 is provided which when turned on actuates moving means 60 and supplies current to the welding electrode assembly 12. The moving means 60 rotates the welding electrode assembly slightly more than 360° around the pipe in order to fuse the end of the ring; the power may then be cut off by means of the switch and the weld has been completed in a single pass.

It is to be noted that the entire welding electrode assembly along with the support members can readily be attached to the pipe sections to be welded by one man and can be thus readily moved to another location to perform a welding operation in the same manner. Furthermore, it can be seen that in moving a welding assembly constructed according to the principles of this invention to another location it may be readily adjusted to accommodate a pipe of different diameter merely by adjusting the distance of spread between the support arms 40 and 42 so that the arm members exert a clamping force on the pipe holding the welding electrode assembly in place.

A welding apparatus constructed according to the principles of this invention can as well readily weld any type of metal without the necessity of changing the electrodes. It is necessary only to vary the current supply to the electrode, and to vary the speed with which the welding electrode assembly travels around the circumference of the pipe in order to accommodate different metals.

A significant advantage offered to users of welding apparatus constructed according to the principles of this invention is that the welding electrode assembly can readily be incorporated into automated machinery including that which is computer-controlled.

The welding process carried out by apparatus constructed according to the principles of this invention materially reduces the hazards to the operator and persons in the vicinity of the welding operation in that the brilliant blue light normally accompanying such a process is absent.

The preferred embodiment described hereinabove is only exemplary, and it will be apparent to those skilled in the art that the elements and their arrangement may be modified within the scope of the appended claim.

What I claim is:

1. Apparatus for electrically welding together along a circumferential seam area aligned pipe sections the edges of which have been shaped to form an annular void occupied by an annular welding fillet, said apparatus comprising: a welding electrode assembly adapted to overlie a portion of the seam area, said assembly including a first roller electrode adapted to electrically engage the periphery of the fillet in the operative position of said assembly, a pair of second roller electrodes electrically insulated from and spaced from opposite sides of said first roller electrode for rotation about axes parallel to the axis of said first roller electrode so as to electrically engage the periphery of the pipe in the operative position of said assembly sections adjacent the seam area, and means for receiving welding current and establishing a current path between said first and second roller electrodes through the fillet and the two pipe sections; and support means including idler rollers rotatable about axes parallel to the axis of said roller electrodes and arcuately spaced from said electrode assembly for engaging the pipe sections, said support means carrying said idler rollers and said welding electrode assembly for relative movement toward and away from each other whereby said welding electrode assembly may be releasably clamped to the pipe sections at the seam area, and whereby said welding electrode assembly may be moved along the annular fillet by imparting rotational movement to said support means about the axis of the pipe sections; and means for pressing said first roller electrode against the periphery of the fillet when said electrode assembly is in its operative position.

2. Apparatus as in claim 1 wherein said support means includes a pair of rigid arms pivoted for rotation about an axis parallel to the axis of said first roller electrode, one of said arms carrying said electrode assembly and the other of said arms carrying said idler rollers, there being at least two of said idler rollers disposed in arcuately spaced relationship from each other.

3. The welding apparatus defined in claim 1 wherein said welding electrode assembly additionally comprises an axle means, said first electrode roller and said second electrode roller being coaxially mounted on said axle means and electrically therefrom, and first and second brush means for electrically connecting said first and second roller electrode means, respectively, to said current receiving means.

4. Apparatus for electrically welding together along a circumferential seam area aligned pipe sections the edges of which have been shaped to form an annular void occupied by an annular welding fillet, said apparatus comprising: a plurality of clamping rollers freely rotatable about parallel axes; a roller support and clamping assembly carrying said rollers at arcuately spaced locations for engagement with spaced locations around the circumference of the pipe sections, at least some of said rollers being mounted for movement transverse to said axis so as to accommodate a range of pipe diameters, said assembly including means for applying relative clamping force between rollers so as to clamp said assembly to the pipe sections; a freely rotatable roller electrode carried by said assembly in a position to tightly engage and press against the peripheral surface of the fillet when said assembly has been clamped to the pipe sections; and means carried by said assembly for receiving welding current and establishing a current path between said roller electrode and at least one of said clamping rollers through the fillet and pipe sections.

5. A method of welding the end edges of pipe sections, said edges having been beveled outwardly to form a circumferential void at the same thereof, comprising the steps of: placing an annular ring of welding filler material which is of a size and shape to entirely fill said void, said ring being free of any axially extending projections and being discontinuous with the ends thereof defining a gap, said gap being of a width which will allow said ends to be joined after one revolution of a welding electrode means; forcing a first roller electrode continuously against the peripheral surface of said ring so as to exert pressure thereon; clamping second roller electrodes in contact with the periphery of each of the pipe sections at locations adjacent the first roller electrode; flowing electric current between the first roller electrode and the second roller electrodes and through the ring and the two pipe sections to fuse the ring to the pipe sections while revolving the electrodes about the circumference of the ring.

6. A method as in claim 5 wherein said ring includes an annular projection which engages in a complementary groove in said first roller electrode thereby guiding the electrodes during movement of the latter about the circumference of the ring.